(12) United States Patent
Levasseur et al.

(10) Patent No.: US 11,810,230 B2
(45) Date of Patent: Nov. 7, 2023

(54) METHOD AND SYSTEM FOR VALIDATING THE GRAPHICAL GENERATION OF SYMBOLS TO DISPLAY

(71) Applicant: Thales, Courbevoie (FR)

(72) Inventors: Nicolas Levasseur, Merignac (FR); Matthieu Grossetete, Merignac (FR); Sylvain Le Henaff, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/718,452

(22) Filed: Apr. 12, 2022

(65) Prior Publication Data
US 2022/0335670 A1 Oct. 20, 2022

(30) Foreign Application Priority Data
Apr. 16, 2021 (FR) ...................... 21 03956

(51) Int. Cl.
*B64D 43/00* (2006.01)
*G06T 11/40* (2006.01)
*G06T 7/00* (2017.01)

(52) U.S. Cl.
CPC .............. *G06T 11/40* (2013.01); *B64D 43/00* (2013.01); *G06T 7/0002* (2013.01); *G06T 2207/10016* (2013.01); *G06T 2207/30168* (2013.01)

(58) Field of Classification Search
CPC ............... G06T 11/40; G06T 7/0002; G06T 2207/10016; G06T 2207/30168; G01C 23/005; B64D 43/00
See application file for complete search history.

(56) References Cited

U.S. PATENT DOCUMENTS

| 7,212,175 | B1 * | 5/2007 | Magee | .................. | G02B 27/01 340/945 |
| 2019/0147281 | A1 * | 5/2019 | Atac | .................... | G01C 23/005 382/100 |

FOREIGN PATENT DOCUMENTS

| EP | 1 892 670 A2 | 2/2008 |
| EP | 1 892 670 A3 | 2/2009 |

OTHER PUBLICATIONS

French Search Report, from the French Patent Office in counterpart French Application No. 2103956, dated Dec. 20, 2021.

(Continued)

*Primary Examiner* — Towfiq Elahi
(74) *Attorney, Agent, or Firm* — ArentFox Schiff LLP

(57) ABSTRACT

The invention relates to a method and system for validating the graphical generation of symbols to display, comprising a graphical generation of symbols to display to form a video stream comprising a plurality of rasters, comprising a pixel generation, with the attribution of at least one associated symbol attribute for each pixel contributing to one of said symbols. The method comprises, for at least one raster of said video stream: obtaining at least one reference symbol attribute associated with at least one symbol to be monitored; identifying pixels having the reference symbol attribute(s), during a scan of the pixels of said raster in a predetermined course direction, these pixels contributing to said at least one symbol to be monitored, and calculating associated characteristic information; validating the display of the symbol(s) to be monitored based on the calculated characteristic information and of source information associated with said symbols to display.

14 Claims, 5 Drawing Sheets

(56) References Cited

OTHER PUBLICATIONS

Wang, B., "Detecting Hazardously Misleading Information on Safety-Critical Displays", 2019 IEEE/AIAA 38th Digital Avionics Systems Conference, pp. 1-5. (2019).

* cited by examiner

METHOD AND SYSTEM FOR VALIDATING THE GRAPHICAL GENERATION OF SYMBOLS TO DISPLAY

This application claims priority to French Patent Application No. 2103956 filed on Apr. 16, 2021, the entire disclosure of which is incorporated by reference herein.

FIELD OF THE INVENTION

The present invention relates to a method and a system for validating the graphical generation of symbols to display, comprising a generation of symbols to display based on source information coming from at least one piece of physical equipment.

BACKGROUND OF THE INVENTION

The invention has a particular application to safety critical applications, in particular in the field of avionics, when the symbols to display are used to control a safety critical system.

Indeed, when an operator's control of a system, such as an aircraft or an industrial process, is safety critical, any misinterpretation by the operator can lead to control or command actions likely to cause accidents.

To control physical equipment, it is planned in particular to display information in the form of symbols relating to the state of the system to be controlled, with this information likely to evolve in real time, to enable the operator to make appropriate decisions. This is the case in an aircraft piloting system for example, with the operator in this case being an aircraft pilot. It is usual, in this field, to display information in the form of symbols that are critical for piloting, representing the position of the aircraft, for example, its altitude, its attitude, the horizon line, the trajectory slope of the aircraft, etc., on a display interface such as a dashboard or a head-up display device placed in front of the pilot's eyes. In this context, any error in the display of a symbol is critical.

The DO-178 and DO-254 standards set the safety conditions applicable to critical avionics software and hardware in commercial and general aviation. However, the cost of developing software and hardware to these standards is very high.

Another possible solution to ensure a high safety level would be to make a double generation of video streams comprising rasters to display, by two different graphical generation systems. Such a solution is also costly, as the second graphical generation system would also have to have the desired safety level assurance.

It would also be possible to use known image processing technologies, such as optical character recognition, but such a solution is not feasible when, as in the case of avionics, the symbols are complex to interpret and may be spatially proximate or mixed, partially superimposed during display, for example.

The purpose of the invention is to remedy the disadvantages of the state of the art by proposing a method and system for validating the graphical generation of symbols to display that is reliable and less complex and costly than known systems.

SUMMARY OF THE INVENTION

To this end, the invention proposes, according to a first aspect, a method for validating the graphical generation of symbols to display, comprising a graphical generation of symbols to display based on source information coming from at least one one piece of physical equipment, to form a video stream comprising a plurality of rasters comprising said symbols, with each raster made up of pixels having associated values, the video stream being intended to display to enable an operator to control a system. The graphical generation of symbols to display comprises a pixel generation, with the attribution of at least one associated symbol attribute for each pixel contributing to one of said symbols. The method further comprises, for at least one raster of said video stream, steps of:

a) obtaining at least one reference symbol attribute associated with at least one symbol to be monitored,
b) identifying pixels having the reference symbol attribute(s), during a scan of the pixels of said raster in a predetermined course direction, the identified pixels contributing to said at least one symbol to be monitored, and calculating characteristic information associated with the identified pixels,
c) validating the display of the symbol or symbols to be monitored based on said calculated characteristic information and source information associated with said symbols to display,
d) in case of absence of validation, raising an alert,
the symbol attributes being selected from a priority or depth value, a transparency value or a dedicated attribute, or a combination of said attributes.

Advantageously, thanks to the use of symbol attributes associated with the symbols to display, the method enables rapid calculation of characteristic information of the symbols to display and rapid validation. Advantageously, the method makes the symbol display compatible with safety critical applications.

The method for validating the graphical generation of symbols to display according to the invention may also have one or more of the following characteristics, taken independently or in any technically conceivable combination.

The characteristic information includes geometric characteristics and statistical characteristics.

The characteristic information includes a number of pixels contributing to the symbol to be monitored, minimum and maximum coordinates of pixels having the reference symbol attribute.

The characteristic information includes coordinates of a central point of the symbol to be monitored.

The central point is a barycenter of the symbol to be monitored, the central point having coordinates that are obtained by averaging the coordinates of the identified pixels contributing to the symbol to be monitored.

The symbol attributes are individually assigned to a pixel or group of pixels.

The method comprises an implementation of steps a) to d) for a plurality of predetermined symbols to be monitored.

According to another aspect, the invention relates to a system for validating the graphical generation of symbols to display, comprising a module for the graphical generation of symbols to display, based on source information from at least one piece of physical equipment, to form a video stream comprising a plurality of rasters comprising said symbols, each raster consisting of pixels having associated values, the video stream being intended to display to enable an operator to monitor a system. The graphical generation module of symbols to display is configured to perform a pixel generation, with the attribution of at least one associated symbol attribute for each pixel contributing to one of said symbols. The system further comprises, for at least one raster of said video stream:

- an identification module, configured to obtain at least one reference symbol attribute associated with at least one symbol to be monitored, to identify pixels having the reference symbol attribute(s), during a scan of the pixels of said raster in a predetermined course direction, with the identified pixels contributing to said at least one symbol to be monitored, and to compute characteristic information associated with the identified pixels,
- a validation module, configured to validate the display of the symbol or symbols to be monitored based on said calculated characteristic information and source information associated with said symbols to display and, in the event of absence of validation, to raise an alert, the symbol attributes being selected from a priority or depth value, a transparency value or a dedicated attribute, or a combination of said attributes.

According to one characteristic, the graphical generation module is implemented by a first processing chain and the identification and validation modules are implemented by a second processing chain.

Advantageously, the graphical generation validation system of symbols to display is configured to implement the method for validating the graphical generation of symbols displayed, in all its embodiments.

According to another aspect, the invention relates to a computer program comprising software instructions that implement a method for validating the graphical generation of symbols to display, as briefly described above, when executed by a programmable electronic device.

BRIEF DESCRIPTION OF THE DRAWINGS

Further features and advantages of the invention will be apparent from the description given below, by way of indication and not in any way limiting, with reference to the appended Figures, of which.

DETAILED DESCRIPTION OF EMBODIMENTS

The invention will be described hereinafter more particularly in its application to an aircraft piloting system, in which symbols critical to assist piloting are to display, intended for an aircraft pilot.

Nevertheless, it should be noted that the invention applies to any system whose control is carried out by an operator on the basis of a display of symbols, in particular to any such system of this type that requires a high safety level, or a "safety critical" system.

Figure 1:
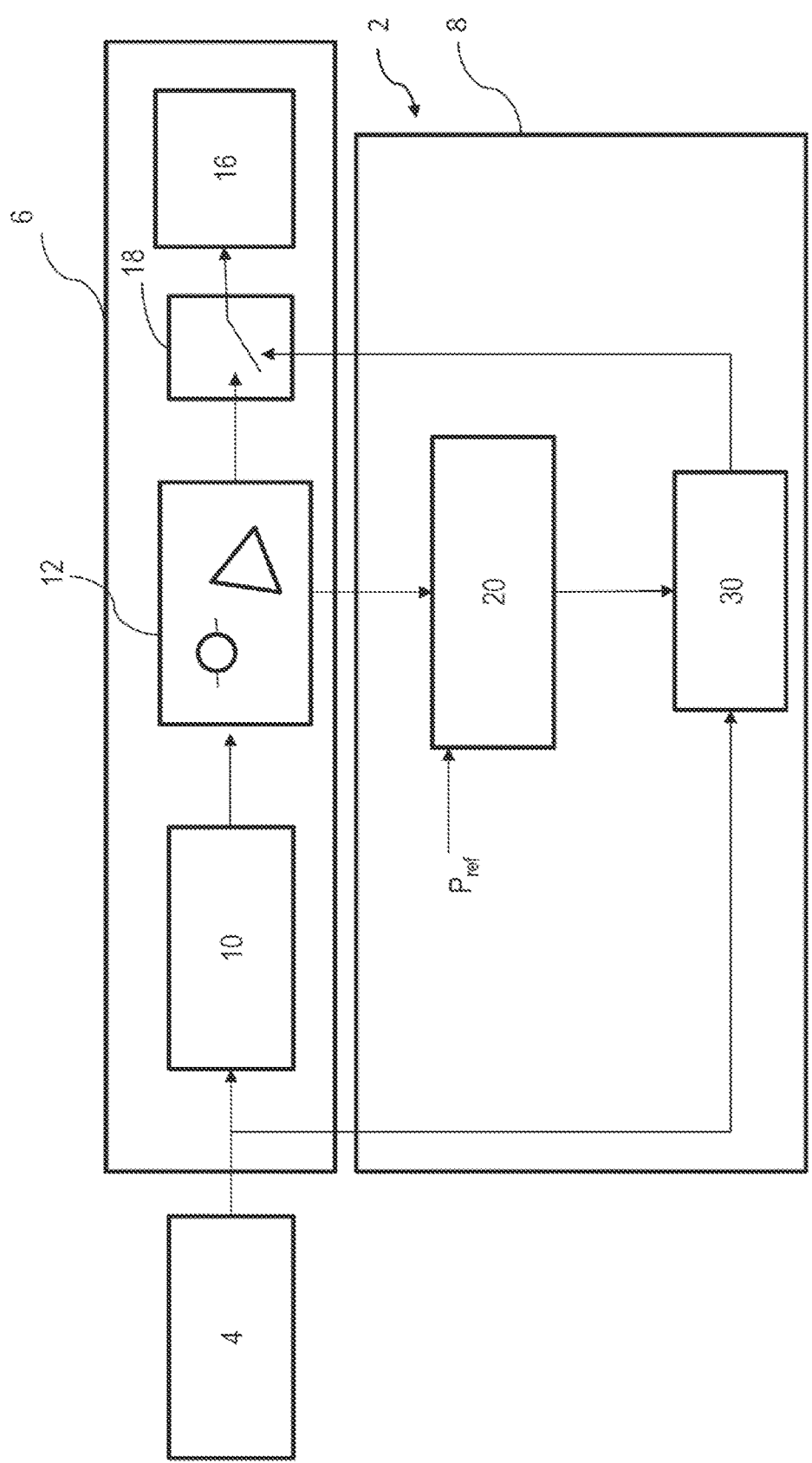
FIG. 1 illustrates a system for validating the graphical generation of symbols to display according to one embodiment.

FIG. 1 schematically illustrates a system 2 for validating the graphical generation of symbols to display, connected to an aircraft piloting system 4, which is not shown in detail here.

The aircraft piloting system 4 provides information, called source information, from different physical equipment such as sensors, actuators, on-board flight instruments, computers, the information including information on altitude, speed, slope, trajectory, etc.

In this example, the system to be controlled by the pilot is the aircraft piloting system, making it possible to pilot the flight of the aircraft.

The system 2 in the illustrated embodiment comprises two processing chains, 6, 8, for example, implemented on two distinct electronic computer devices, comprising a first chain 6, for the graphical generation of symbols to display, and a second chain 8, for validation before displaying the symbols to display.

According to one variant, the two processing chains 6, 8 are combined on a single programmable electronic device, which, in this case, carries out both the graphical generation of symbols to display and the validation of the symbols generated.

In particular, the system 2 comprises a graphical generation module 10, the output of which is a video stream 12 comprising a plurality of rasters, each raster consisting of pixels, each pixel having one or more color values, as well as one or more associated attributes. Each raster comprises a composition of symbols to display on a display interface 16, the symbols capable of being spatially proximate or mixed, such as partially superimposed during display.

The video stream 12 is intended to be displayed to enable an operator to control the piloting system, in particular to act on the piloting instruments to fly the aircraft.

The system 2 for validating the graphical generation of symbols works for any type of symbol to display, without constraint on the shape of the symbols.

In one particular application, in the field of avionics, for example, at least some of the symbols to display are selected from predetermined symbol categories, defining the shape(s) of the symbols in a category, for example. The display position and/or orientation of each symbol is calculated in real time based on received source information.

In addition, graphical symbols to display also comprise alphanumeric symbols, which show useful values graphically, such as the current altitude of the aircraft.

The symbols displayed on the graphical interface 16 enable the pilot to make decisions, operate controls etc. for piloting the aircraft effectively.

The system 2 also comprises a module 18 for making the display of a raster of the video stream 12 generated conditional on the positive validation of the symbols to display. In case of negative validation, raising an alert or displaying a predetermined alert message is provided, for example.

The graphical generation module 10 assigns a symbol attribute to each symbol generated, based on a symbol category from a predetermined set of symbol categories, for example. A distinction is made between non-critical symbols and critical symbols, for example. Among the critical symbols, it is possible to distinguish several categories according based on a sub-level of criticality, or a functional grouping.

According to one variant, the same attribute is associated with several different symbols.

In a variant or additionally, several attributes are associated with the same symbol or symbol category.

Each pixel contributing to a given symbol has the associated symbol attribute or attributes.

Symbol attributes include, for example: a specific color, priority, transparency or depth value, a specific dedicated attribute in order to perform differentiated processing. Preferably, a symbol attribute is encoded as an alphanumeric attribute value assigned to each pixel.

Preferably, symbol attributes are selected amongst a priority, transparency or depth value, a specific dedicated attribute. A combination of the attributes amongst this list may also be chosen as a symbol attribute.

Advantageously, the symbol attributes are encoded in the rasters of the video stream, in association with the pixels of each raster.

For example, if the symbol attribute is a priority or depth value, the symbol attributes are stored in depth buffers which can be easily processed.

In one embodiment, in the case of a raster composition comprising several symbols to display, including partially overlapping symbols, in an overlapping area of two or more symbols, the displayed pixels have the same depth corresponding to the symbol chosen for a foreground display.

The chain 8 for validating the symbols generated by the graphical generation module 10 includes a module 20 for identifying pixels in each raster to display that contribute to symbols to be monitored, of the symbols to display, and for calculating associated characteristic information. The identification of pixels that contribute to the symbols to display advantageously uses the symbol attributes previously assigned by the graphical generation module 10.

For the validation of one or more symbols of a given category, a reference value is provided for each attribute characterizing the symbols to be identified ($P_{ref}$), as an input to the module 20 for identifying pixels contributing to the symbols to display and for calculating associated characteristic information.

In one variant, several reference attributes are provided.

According to another variant, a plurality of identification modules 20 are provided, each identification module 20 implementing the identification of one or more symbols associated with the same symbol attribute and the calculation of associated characteristic information.

The associated characteristic information for the identified symbols includes, but is not limited to, geometric characteristics and statistical characteristics.

The calculated characteristic information is used, in combination with source information for a validation by the validation module 30 of the identified symbol(s). The result of the validation determines the display of the symbol(s) in question.

Preferably, the characteristic information(s) are computed on the fly.

Figure 2:
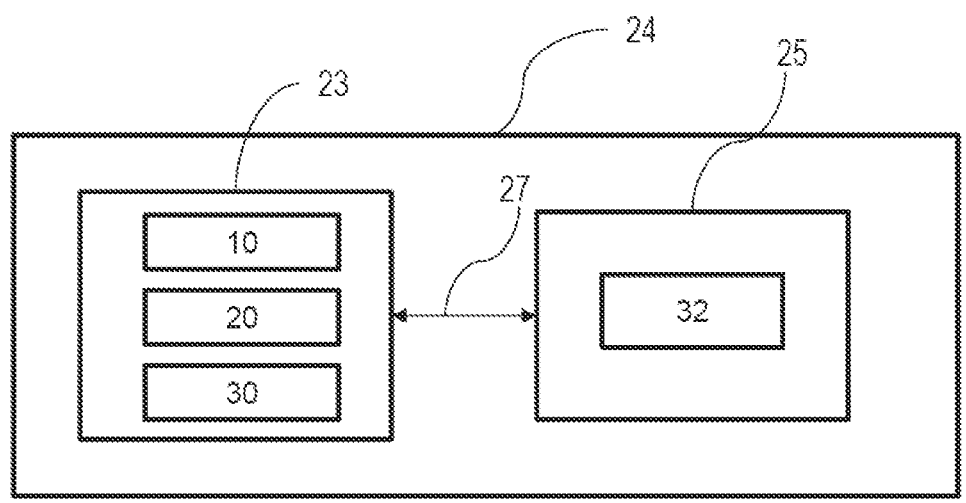
FIG. 2 is a synoptic of the main modules of a programmable electronic device configured to implement a method for validating the graphical generation of symbols displayed according to one embodiment of the invention.

FIG. 2 schematically illustrates a programmable electronic device 24 configured to implement method for validating the graphical generation symbols according to the invention. The programmable electronic device includes a computing unit 23, consisting of one or more computing processors, adapted to execute computer program instructions when the device 24 is powered on. The programmable electronic device 24 also includes an electronic memory unit 25, adapted to communicate with the computing unit 23 via a communication bus 27. In particular, the memory unit is adapted to store an association 32 between symbol categories and symbol attributes, in the form of a mapping table, for example.

The computing unit 23 is adapted to execute a computer program containing code instructions for performing a graphical symbol generation validation method according to the invention.

In particular, the computing unit 23 is adapted to implement a graphical generation module 10, a module 20 for identifying pixels contributing to the symbols to display and for calculating associated characteristic information, and a validation module 30.

In one embodiment, each module 10, 20, 30 is implemented as software code.

In a variant, the modules 10, 20, 30 are each made in the form of a programmable logic component, such as a Field Programmable Gate Array (FPGA), a general-purpose graphics processing unit (GPGPU), or a dedicated integrated circuit such as an application specific integrated circuit (ASIC).

According to another variant, when the processing chains 6 and 8 are different, the graphical generation module 10 is implemented by a first computing unit of the first processing chain 6, and the module 20 for identifying pixels contributing to the symbols and for calculating associated characteristic information, and the validation module 30 are implemented by a second computing unit of the second processing chain 8.

Figure 3:
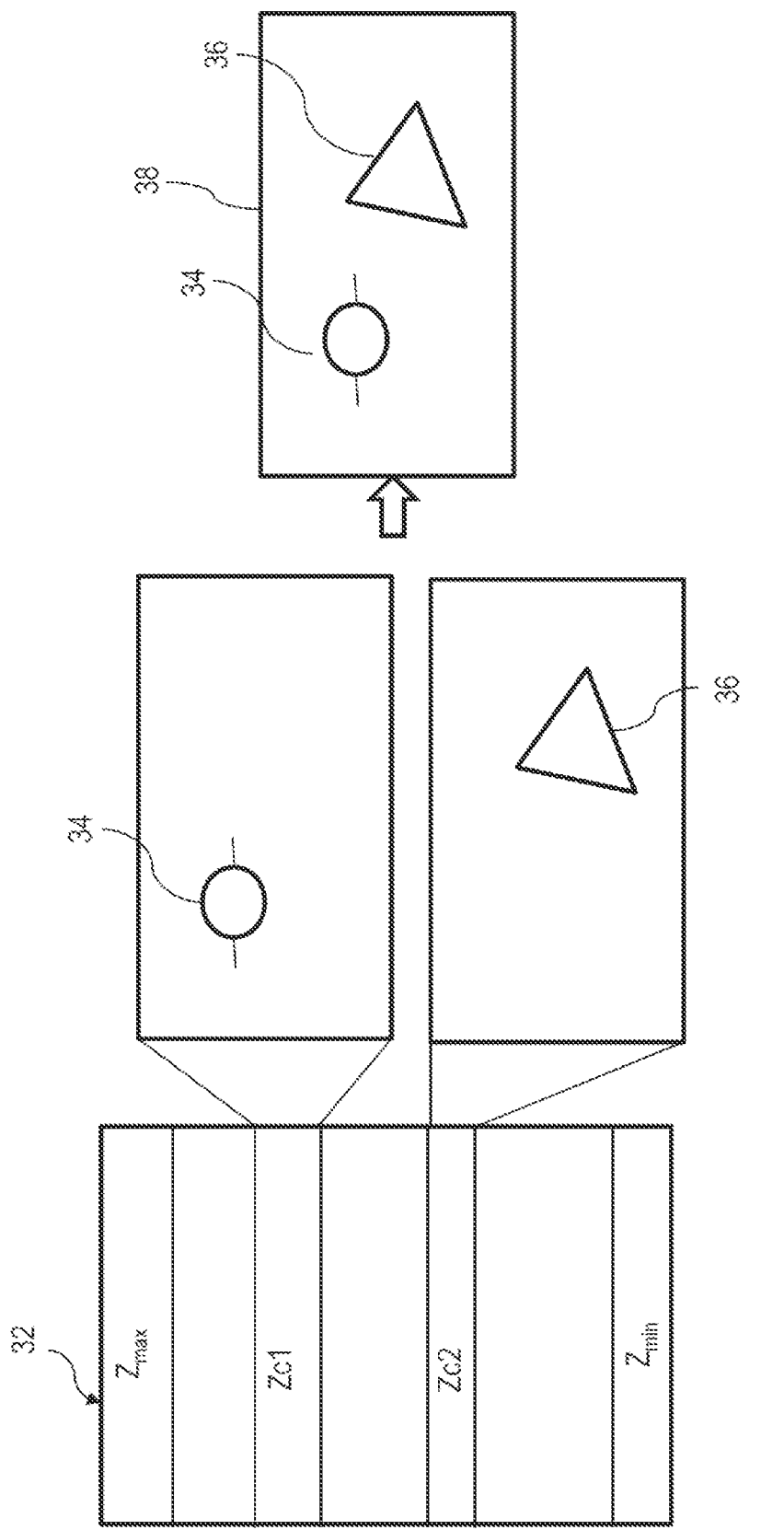
FIG. 3 is a schematic example of symbols to display and associated symbol attributes.

FIG. 3 schematically illustrates an example of symbol attributes. In this example, each pixel in a raster of the generated video stream has an associated depth value. The graphical generation module 10 assigns depth levels Z to each pixel, with these depth levels varying between a minimum value $Z_{min}$ and a maximum value $Z_{max}$.

In the example shown in FIG. 3, two symbols, a first symbol 34 and a second symbol 36, have been schematically illustrated, with the first symbol 34 having an associated first depth value Zc1, and the second symbol 36 having an associated second depth value Zc2. The raster 38 containing the two generated symbols is composed of background pixels having a default depth level, of $Z_{min}$ pixels, for example, forming the first symbol 34 having a depth value equal to the first depth value Zc1, and pixels forming the second symbol 36 having a depth value equal to the second depth value Zc2. The default depth values $Z_{min}$, the first depth value Zc1 and the second depth value Zc2 are different.

According to a variant not shown, the symbol attribute is a color, for example, and in this case the raster 38 is composed of image background pixels having a default color value, pixels forming the first symbol 34 having a value equal to a first color value, and pixels forming the second symbol 36 having a value equal to a second color value. The default color value, the first color value, and the second color value are all different, so as to be differentiable.

Figure 4:
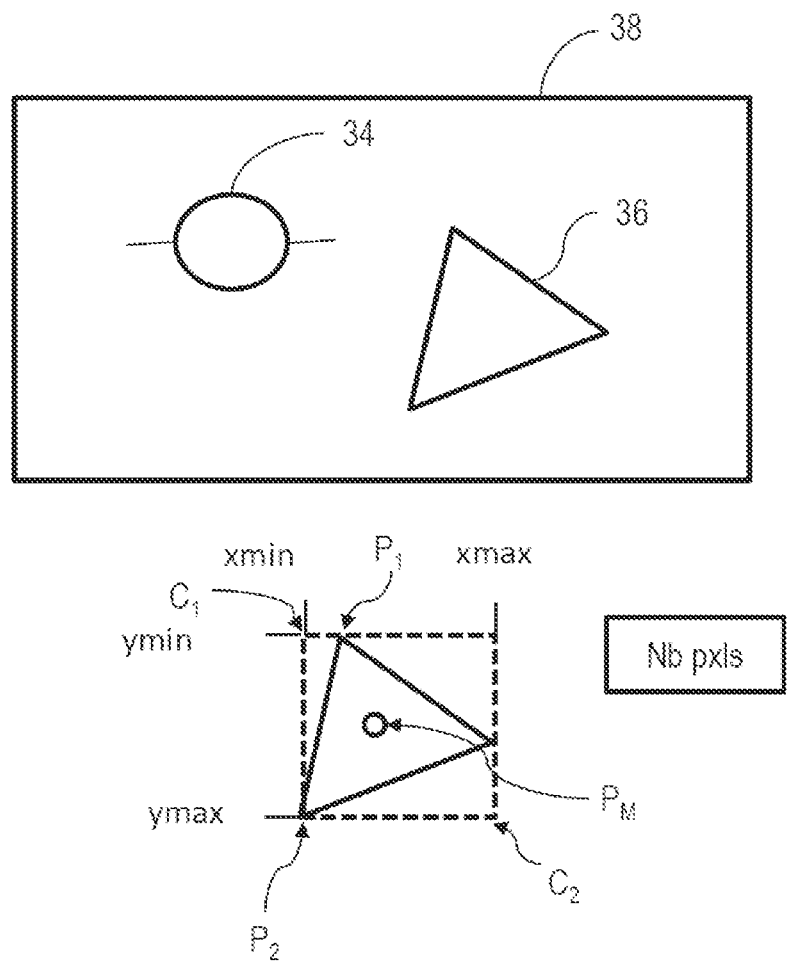
FIG. 4 is a schematic example of symbols to display and associated characteristic information.

FIG. 4 schematically illustrates a raster 38 of a generated video stream including two symbols to display 34, 36. For example, the second symbol 36 is selected for validation, that is, all the pixels contributing to the representation of this second symbol 36 are identified based on the associated symbol attribute.

For example, the pixels of the second symbol 36 are identified as the pixels of the raster are scanned, in a predetermined course direction, for example, such as the so-called "raster scan", row by row, from the upper left corner to the lower right corner of the pixel matrix forming the raster.

The characteristic information of the symbol includes statistical characteristics, for example, such as the number of pixels Nb_pxls forming the second symbol 36, and geometric characteristics such as the coordinates in the raster of the first pixel P$_1$ belonging to this second symbol 36, in the predetermined course direction, the coordinates of the last pixel P$_2$ belonging to this second symbol 36, the spatial coordinates x$_{min}$, y$_{min}$ and x$_{max}$, y$_{max}$ of the extreme corners C1 and C2 of a rectangle circumscribed by said second symbol 36.

In one embodiment, the coordinates are expressed in the raster reference, and express the row and column indices of the position of the pixel in the matrix of pixels forming the raster, the coordinates noted x refer to the row index and the coordinates noted y refer to the column index of the matrix. For example the coordinates (0,0) indicate the pixel located at the top left corner of the matrix and the coordinates (x$_{min}$, y$_{min}$) indicate the bottom right corner of the matrix.

In addition, the coordinates of a central point P$_M$ of the symbol are calculated.

The central point P$_M$ is the barycenter of the symbol 36, for example, and the coordinates of this point are obtained by the sum of the X (resp. Y) positions of the identified pixels divided by the number of identified pixels, in other words the average of the positions of the identified pixels. In another variant, the calculation is performed for a color component of the intercepted pixels. According to another variant, the contributions in the sum of the X(resp. Y) positions are weighted by the value of a color component.

Of course, FIG. 4 illustrates examples of characteristic information of a symbol. Other geometric or statistical features can be extracted or calculated. The extracted/computed geometric and/or statistical features are chosen in particular based on the set of symbol categories to be distinguished.

Figure 5:
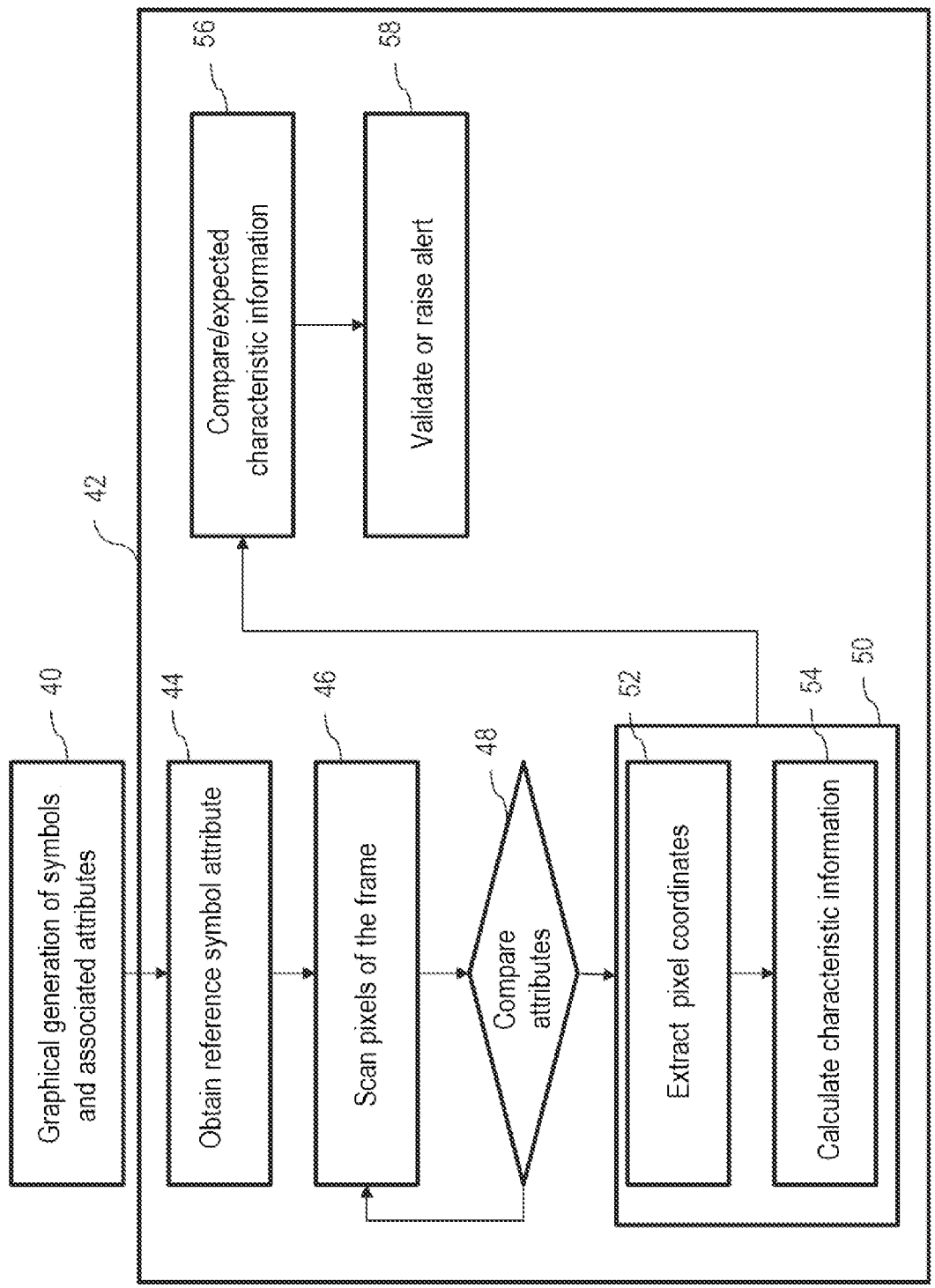
FIG. 5 is a synopsis of the main steps of a method for validating the graphical generation of symbols displayed according to one embodiment.

FIG. 5 is a synoptic of the main steps of a method for validating the graphical generation of symbols to display according to one embodiment.

The method comprises a step 40 of graphical generation of rasters containing symbols to display, the symbols being selected and positioned based on source information of the symbols to display, coming from physical equipment such as sensors positioned on the aircraft, giving the position of the aircraft and its orientation.

Furthermore, as explained above, for each symbol to display, based on the symbol category to which it belongs, a symbol attribute is associated with each pixel of the graphical representation of that symbol. For example, the symbol attribute is a depth value as shown with reference to FIG. 3. In a variant, the symbol attribute is a priority value, a transparency, a color, a dedicated attribute or a combination of these attributes. According to another variant, multiple attributes are assigned to a single symbol, such as attributes of priority value and color.

In one variant, symbol attributes are assigned to a group of pixels.

Thus, each raster to display contains pixels, each having one or more color values, and one or more associated attributes, which are encoded in the raster. In other words, each pixel belonging to a symbol to display is marked with one or more associated attributes.

The step 40 is followed by the validation 42 of the graphical generation of symbols to display, implemented for one raster of the video stream to display, and repeated on successive rasters or spaced rasters, for example, according to a safety objective to be met, in particular an acceptable error detection latency.

The validation 42 includes a step 44 of obtaining at least one reference symbol attribute, from a reference pixel of a symbol to display for which validation is desired, for example, hereinafter referred to as a symbol to be monitored.

The raster of the video stream being processed is scanned in the progression step 46, in a predetermined course direction, such as the "raster scan" course.

For each pixel in the raster, over the course, the associated pixel attribute is compared to the reference symbol attribute, at the comparison step 48. For example, if the reference symbol attribute is a depth value, the depth associated with the pixel is compared to the reference depth.

If there is a difference, the comparison step 48 is followed by the previously described progression step 46, with course of the raster in the predetermined course direction continuing.

In case of equality in the comparison step 48, the corresponding pixel is identified as a pixel contributing to the symbol(s) to be monitored, and thereafter a step 50 of computing characteristic information of pixels having the reference attribute is implemented.

In this step 50, information associated with the pixels is extracted, such as coordinates of the pixels having the reference attribute, and characteristic information is calculated and stored.

For example, step 50 includes a sub-step 52 of storing the coordinates of the pixels having the reference attribute, and a sub-step 54 of calculating characteristic information in which the coordinates of the first pixel associated with the symbol are stored, and the minimum and maximum coordinates x$_{min}$, y$_{min}$, x$_{max}$, y$_{max}$ of the pixels that have the reference attribute are calculated and stored. These coordinates are characteristic geometric information of the symbol. In addition, a count of the number of pixels with the reference attribute is made, by increasing the counter each time a new pixel with the reference attribute is identified, for example. The number of pixels contributing to the symbol to be monitored is thus obtained and stored.

Finally, when the entire raster being processed has been scanned, the characteristic, geometric and statistical information of the symbol whose pixels have the reference symbol attribute value is completed.

According to one embodiment, the validation step 42 implements a combination of multiple reference attributes.

The method then includes a step 56 of comparing the calculated characteristic information to source information, which is expected characteristic information received from the aircraft piloting system.

For example, the piloting system indicates an expected position of a symbol, and a comparison of the coordinates of the center pixel of the symbol to display at the expected position enables the display to be validated or not.

For example, if the symbol to display is a guidance symbol, the calculated position is validated based on a drawing of the landing strip.

For example, if the symbol to display is an alphanumeric character, the characteristic information of the number of pixels and the position of the central point make it possible to deduce which alphanumeric symbol it is, and then to compare the value of the symbol to display with an expected value to display, which is a source information, transmitted by the piloting system.

Advantageously, this type of comparison is carried out at low computational cost, while the geometric forms of alphanumeric symbols are relatively complex and recognition of them requires much higher computational resources.

Based on the result of the step 56, the generated display symbol is validated or not validated. The validation step 58 authorizes the display of the raster containing the validated symbol. In case of non-validation, an alarm is raised, information indicating that a display error has occurred is transmitted to the pilot, for example, a message indicating a need for verification is displayed, for example, or an audible alarm is emitted. In a variant or additionally, a video stream from another computer is displayed.

The method has been described above in the case of validation of one or more symbols to display, associated with a given reference symbol attribute.

Of course, the method applies analogously for validation of a plurality of symbols to display from one raster of the video stream. For the validation of a plurality of symbols to display, according to one embodiment, the steps 44 to 58 are repeated, with as many reference symbol attributes as different symbols to be validated. According to one embodiment, if computational resources permit, the steps 44 through 58 are performed in parallel for each reference symbol attribute.

In one variant, the reference symbol attributes are extracted from the raster being processed. In this embodiment, a scan of the pixels of the raster, in the predetermined course direction, is performed, and the distinct symbol attributes encountered are extracted and stored, and then validation is performed, sequentially or in parallel, for each of the extracted symbol attributes used as the reference symbol attribute.

Advantageously, the proposed method saves computational resources, and therefore requires limited computational power, by calculating characteristic information for symbols as the pixels of a raster are scanned (i.e. on the fly) and by using comparison-based calculations for validation.

The invention claimed is:

1. A method for validating the graphical generation of symbols to display, comprising a graphical generation of symbols to display, based on source information coming from at least one physical piece of equipment, to form a video stream comprising a plurality of rasters comprising said symbols, each raster consisting of pixels having associated values, the video stream being intended to be displayed in order to enable an operator to control a system,
wherein the graphical generation of symbols to display comprises a pixel generation with the attribution of at least one associated symbol attribute for each pixel contributing to one of said symbols,
the method further comprising, for at least one raster of said video stream, the steps of:
a) obtaining at least one reference symbol attribute associated with at least one symbol to be monitored,
b) identifying pixels having the reference symbol attribute(s), during a scan of the pixels of said raster in a predetermined course direction, the identified pixels contributing to said at least one symbol to be monitored, and calculating characteristic information associated with the identified pixels,
c) validating the display of the symbol or symbols to be monitored based on said calculated characteristic information and of source information associated with said symbols to display,
d) in case of absence of validation, raising an alert,
the symbol attributes being selected from a priority or depth value, a transparency value or a dedicated attribute, or a combination of said attributes,
wherein said characteristic information includes a number of pixels contributing to the symbol to be monitored, minimum and maximum coordinates of the pixels having the reference symbol attribute.

2. The method according to claim 1, wherein said characteristic information includes geometric characteristics and statistical characteristics.

3. The method according to claim 1, wherein the symbol attributes are individually assigned to a pixel or a group of pixels.

4. The method according to claim 1 comprising implementing steps a) to d) for a plurality of predetermined symbols to be monitored.

5. A computer program comprising software instructions that implement a method for validating the graphical generation of symbols to display according to claim 1, when executed by one or more programmable electronic devices.

6. A system for validating the graphical generation of symbols to display, comprising a module for the graphical generation of symbols to display, based on source information coming from at least one piece of physical equipment, in order to form a video stream comprising a plurality of rasters comprising the said symbols, each raster consisting of pixels having associated values, the video stream being intended to be displayed in order to enable an operator to control a system
wherein the module for the graphical generation of symbols to display is configured to perform a pixel generation, with the attribution of at least one associated symbol attribute for each pixel contributing to one of said symbols,
the system further comprising, for at least one raster of said video stream,
an identification module configured to:
obtain at least one reference symbol attribute associated with at least one symbol to be monitored,
identify pixels having the reference symbol attribute (s), during the pixels of said raster being scanned in a predetermined course direction, the identified pixels contributing to said at least one symbol to be monitored, and calculating characteristic information associated with the identified pixels,
a validation module configured to validate the display of the symbol or symbols to be monitored based on said calculated characteristic information and source information associated with said symbols to display, and, in the event of absence of validation, to raise an alert,
the symbol attributes being selected from a priority or depth value, a transparency value or a dedicated attribute, or a combination of said attributes,
wherein said characteristic information includes a number of pixels contributing to the symbol to be monitored, minimum and maximum coordinates of the pixels having the reference symbol attribute.

7. The system according to claim 6, wherein said graphical generation module is implemented by a first processing chain and the identification and validation modules are implemented by a second processing chain.

8. A method for validating the graphical generation of symbols to display, comprising a graphical generation of symbols to display, based on source information coming from at least one physical piece of equipment, to form a video stream comprising a plurality of rasters comprising said symbols, each raster consisting of pixels having associated values, the video stream being intended to be displayed in order to enable an operator to control a system,
wherein the graphical generation of symbols to display comprises a pixel generation with the attribution of at least one associated symbol attribute for each pixel contributing to one of said symbols, the method further comprising, for at least one raster of said video stream, the steps of:
- a) obtaining at least one reference symbol attribute associated with at least one symbol to be monitored,
- b) identifying pixels having the reference symbol attribute(s), during a scan of the pixels of said raster in a predetermined course direction, the identified pixels contributing to said at least one symbol to be monitored, and calculating characteristic information associated with the identified pixels,
- c) validating the display of the symbol or symbols to be monitored based on said calculated characteristic information and of source information associated with said symbols to display,
- d) in case of absence of validation, raising an alert, the symbol attributes being selected from a priority or depth value, a transparency value or a dedicated attribute, or a combination of said attributes, wherein said characteristic information includes coordinates of a central point of the symbol to be monitored, and wherein the central point is a barycenter of the symbol to be monitored, the central point having coordinates that are obtained by averaging the coordinates of the identified pixels contributing to the symbol to be monitored.

9. The method according to claim 8, wherein said characteristic information includes geometric characteristics and statistical characteristics.

10. The method according to claim 8, wherein the symbol attributes are individually assigned to a pixel or a group of pixels.

11. The method according to claim 8 comprising implementing steps a) to d) for a plurality of predetermined symbols to be monitored.

12. A computer program comprising software instructions that implement a method for validating the graphical generation of symbols to display according to claim 8, when executed by one or more programmable electronic devices.

13. A system for validating the graphical generation of symbols to display, comprising a module for the graphical generation of symbols to display, based on source information coming from at least one piece of physical equipment, in order to form a video stream comprising a plurality of rasters comprising the said symbols, each raster consisting of pixels having associated values, the video stream being intended to be displayed in order to enable an operator to control a system wherein the module for the graphical generation of symbols to display is configured to perform a pixel generation, with the attribution of at least one associated symbol attribute for each pixel contributing to one of said symbols, the system further comprising, for at least one raster of said video stream,
an identification module configured to:
obtain at least one reference symbol attribute associated with at least one symbol to be monitored,
identify pixels having the reference symbol attribute(s), during the pixels of said raster being scanned in a predetermined course direction, the identified pixels contributing to said at least one symbol to be monitored, and calculating characteristic information associated with the identified pixels,
a validation module configured to validate the display of the symbol or symbols to be monitored based on said calculated characteristic information and source information associated with said symbols to display, and, in the event of absence of validation, to raise an alert, the symbol attributes being selected from a priority or depth value, a transparency value or a dedicated attribute, or a combination of said attributes, wherein said characteristic information includes coordinates of a central point of the symbol to be monitored, and wherein the central point is a barycenter of the symbol to be monitored, the central point having coordinates that are obtained by averaging the coordinates of the identified pixels contributing to the symbol to be monitored.

14. The system according to claim 13, wherein said graphical generation module is implemented by a first processing chain and the identification and validation modules are implemented by a second processing chain.

* * * * *